US006454837B1

(12) United States Patent
Pittroff et al.

(10) Patent No.: US 6,454,837 B1
(45) Date of Patent: Sep. 24, 2002

(54) SEPARATION OF GASES CONTAINING $SF_6$

(75) Inventors: Michael Pittroff, Hannover; Thomas Schwarze, Ahlten; Heinz-Joachim Belt, Burgwedel, all of (DE); Pierre Barthélemy, Pietrebais (BE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/763,185

(22) PCT Filed: Aug. 11, 1999

(86) PCT No.: PCT/EP99/05886

§ 371 (c)(1),
(2), (4) Date: Mar. 20, 2001

(87) PCT Pub. No.: WO00/10688

PCT Pub. Date: Mar. 2, 2000

(30) Foreign Application Priority Data

Aug. 20, 1998 (DE) .......................... 198 37 845
Mar. 11, 1999 (DE) .......................... 199 10 678

(51) Int. Cl.⁷ .......................... B01D 53/04; B01D 53/22
(52) U.S. Cl. .............................. 95/47; 95/131; 95/135; 96/4; 96/130; 96/134; 96/147; 55/356
(58) Field of Search .......................... 95/45, 47, 131, 95/133, 135; 96/4, 8, 10, 108, 130, 134, 142

(56) References Cited

U.S. PATENT DOCUMENTS 3,675,392 A * 7/1972 Reighter .................... 55/25
5,192,727 A * 3/1993 Nair et al. .................. 502/64
5,417,742 A * 5/1995 Tamhankar et al. ....... 95/131 X
5,720,797 A * 2/1998 Yates et al. .................... 95/96
5,730,779 A * 3/1998 Chernyakov et al. .......... 95/45
5,759,237 A * 6/1998 Li et al. .................... 95/47 X
5,785,741 A * 7/1998 Li et al. ......................... 96/4
5,855,647 A * 1/1999 Li et al. .................... 95/47 X
5,858,065 A * 1/1999 Li et al. ........................ 95/45
5,976,222 A * 11/1999 Yang et al. ................. 95/47 X
6,096,114 A * 8/2000 Li et al. .................... 95/52 X

FOREIGN PATENT DOCUMENTS

EP          0754487 A1 *  1/1997

* cited by examiner

Primary Examiner—Robert H. Spitzer
(74) Attorney, Agent, or Firm—Crowell & Moring LLP

(57) ABSTRACT

Gas mixtures of $SF_6$ and $N_2$, which have been used, for example, as an insulating filler gas for underground cables, for insulating-gas window panes or as a filler gas for car tires and $SF_6$/air mixtures which have been used as a protective gas when casting magnesium can be separated if they are contacted with hydrophobic zeolites of a certain pore size as selective adsorption agent for sulfur hexafluoride. For a relatively high $SF_6$ concentration, the mixture is preferably first subjected to a membrane separation process and the permeate is contacted with the adsorption agent. The invention also relates to an apparatus for carrying out the process. The process may also be used for separating $SF_6$ from exhaust gases.

15 Claims, 2 Drawing Sheets

SEPARATION OF GASES CONTAINING $SF_6$

BACKGROUND OF THE INVENTION

The invention relates to a process for the separation of gas mixtures which contain sulfur hexafluoride ($SF_6$).

$SF_6$-containing gases are used for widely varying purposes in industry. $SF_6/N_2$ mixtures or $SF_6$/noble gas mixtures and $SF_6$/air mixtures are used, for example, in the manufacture of windows as an insulating filler gas, and in the tyre industry as a pressure-resistant, noise-damping filler gas.

Mixtures of sulfur hexafluoride and nitrogen are used as an insulating filler gas for underground cables, see German Utility Model 297 20 507.2. Usually, these mixtures contain 5 to 30% by volume sulfur hexafluoride, remainder nitrogen to make up to 100% by volume.

Mixtures of sulfur hexafluoride and air and optionally $CO_2$ are used as a protective gas cushion when casting magnesium. $SF_6$ is usually contained in these mixtures in a quantity of 0.05 to 1% by volume.

$SF_6$-containing exhaust air may also occur in industry.

SUMMARY OF THE INVENTION

It is desirable to work up these mixtures once they have been used, with the objective of re-using the $SF_6$. The problem is that nitrogen or air takes up a large volume percentage in the gas mixture, and requires a large transport capacity. It is an object of the present invention to devise a process for separating the above gas mixtures which, upon re-use of the $SF_6$ from the mixtures, requires only a small transport capacity.

A further object is to provide a suitable apparatus for performing the process according to the invention.

The process according to the invention for separating $SF_6$-containing gas mixtures provides for the mixture to be contacted with hydrophobic zeolites having an $SiO_2/Al_2O_3$ ratio ("modulus") of at least 80 and a pore diameter of 4 to 7 Å (0.4 to 0.7 nm), in order to adsorb $SF_6$ preferentially. The substantially $SF_6$-free nitrogen or the $SF_6$-free air can be let off into the environment.

This simple way of performing the process is particularly suitable when relatively small quantities of gas mixture are to be separated or if the $SF_6$ content is low, e.g. below 5% by volume. It is therefore particularly well suited for the mixtures of $SF_6$ and air and optionally $CO_2$ which originate from the casting of magnesium and usually contain 0.05 to 1% by volume $SF_6$. If additional impurities such as $SO_2F_2$, $SO_2$ etc. are contained therein, purification may be effected beforehand, such as washing with water or lye or sorption by means of e.g. $Al_2O_3$. This way of performing the process is also well suited for separating filler gases from insulating panes and car tires.

For example, the protective gas from the magnesium industry containing 0.2% by volume $SF_6$, remainder air and $CO_2$, is drawn off and the air is separated off. The sorbed $SF_6$ and $CO_2$ is recycled. With a few kilogrammes of adsorber material, virtually a whole week's production of exhaust gas from a melting crucible can be purified. Magnesium can therefore be produced in a far more environmentally friendly manner than previously. The desorption time is not longer, or even shorter, than the sorption time.

Although the $SF_6$ content is frequently 10% by volume for insulating-gas window panes, the extractor units frequently draw in secondary air, so that the effective $SF_6$ content is lower upon sorption.

One embodiment of the invention relates to a process for the purification of $SF_6$-containing gases, in particular air or waste air contaminated with $SF_6$.

This aspect of the invention is based on the finding that $SF_6$ can generally be separated out of gases using the selected zeolites.

Simple sorption tests show whether the separation occurs to the desired extent for a particular gas from which $SF_6$ is to be removed. The separation effect is very successful if the molecules of the gas from which the $SF_6$ is to be separated are larger or smaller than the pore diameter of the zeolite used. In this manner, for example, gases from production can be purified.

The method can also be used for the purification of air or exhaust air which is contaminated with $SF_6$.

The improvement according to the invention resides in effecting the purification of air or exhaust air which is contaminated with $SF_6$.

If additional impurities such as $SO_2F_2$, $SO_2$ etc. are contained therein, purification can be effected beforehand, such as washing with water or lye or sorption by means of, for example, $Al_2O_3$.

The purification of the exhaust air, for example from plants in which $SF_6$ is produced or used is effected on environmental grounds.

The purification of air containing $SF_6$ may be desirable because $SF_6$ may have a disruptive effect on industrial processes. One field of application is therefore the purification of the air which is circulated in industrial plants.

The content of $SF_6$ in such air is frequently very low (in the range of parts per million). For this reason, it is usually possible to dispense with the provision of membrane separation beforehand. Furthermore, in view of the small quantities of $SF_6$, although it is possible to regenerate the laden sorbents, they may also be disposed of in the laden state.

To improve the purifying action, it is of course also possible to arrange a plurality of adsorption stages (2, 3 or more) in series.

This embodiment according to the invention is distinguished by a high purifying action for air contaminated with $SF_6$. The purified exhaust air or air can be let off harmlessly into the environment or be passed harmlessly into plants in which $SF_6$ would have been a disturbing contaminant and serve as ambient air therein.

The process may for example also be applied to air or exhaust air to which $SF_6$ is added, e.g. as a tracer substance. Even air or exhaust air in plants manufacturing or using $SF_6$ can be purified if this air or exhaust air is contaminated with $SF_6$.

One preferred embodiment relates to the working-up of $SF_6/N_2$ mixtures, with reference to which the invention will be explained further.

If relatively large quantities are to be separated, or if the $SF_6$ is relatively large, the $SF_6/N_2$ mixture may first be subjected to low-temperature treatment. Preferably the mixture is cooled to a temperature in the range from −70°C. to −110° C., in particular to a temperature in the range from −70°C. to −100° C. $SF_6$ which only has a low content of $N_2$ then condenses out. Furthermore, a gas phase remains which predominantly consists of nitrogen with low contents of $SF_6$. The gas phase obtained in this manner is then separated by absorption as described above, so that nitrogen substantially free of $SF_6$ is obtained and can be let off into the environment. The $SF_6$ can be recycled.

An alternative, preferred embodiment for relatively large quantities of gas mixture, or those gas mixtures which have a higher content of $SF_6$, will be described below. This embodiment provides for the combination of membrane separation processes and adsorption. It is highly suitable for mixtures of $SF_6$ and $N_2$, for example from underground cables, which have an $SF_6$ content of 5 to 30% by volume.

This embodiment of the process according to the invention provides for an $SF_6/N_2$ mixture to be separated in at least one membrane separation stage into a retentate with an increased content of $SF_6$ and a permeate with a reduced content of $SF_6$, and for the permeate to be passed into at least one adsorption stage with the hydrophobic zeolites described above for further separation. It is preferred to provide two or more membrane separation stages and two or more adsorption stages.

The pressure on the entry side of the membrane or membranes is usually greater than the ambient pressure. For example, the gas mixture to be separated may be supplied at a pressure of up to 20 bar. If a plurality of membranes are provided, a compressor is arranged in front of each membrane. The permeate will then usually have a pressure which corresponds approximately to the ambient pressure upon entry into the adsorber stage. If desired, the permeate may be compressed before entry into the adsorber stage. This is however not essential. It is simplest to feed the permeate into the adsorber stage at the pressure which results from the membrane. The pressure is then usually up to 4 bar (absolute), preferably up to 2 bar (absolute).

If two membrane separation stages are provided, expediently the following guidance of the gas streams is provided: the mixture to be separated—for example, a mixture of sulfur hexafluoride and nitrogen containing 20% by volume $SF_6$ from underground cables—is fed to the first membrane. Since the membrane preferentially allows nitrogen to pass, a permeate with a high nitrogen content and a low sulfur hexafluoride content is obtained. The permeate is introduced into the adsorber, or into the first adsorber; the gas mixture leaving the first adsorber is then introduced into a second, and then possibly into a third, etc., adsorber. Experiments have shown that after passing through just one membrane and two adsorbers filled with hydrophobic zeolites a nitrogen containing less than 10 ppm $SF_6$ is obtained. The retentate of the first membrane is introduced into an additional membrane. The permeate resulting from this second membrane is introduced into the first membrane. The retentate from the second membrane is sulfur hexafluoride with small amounts of nitrogen. It can be stored temporarily after liquefaction with a compressor, be re-used immediately or be worked up with further enrichment of the sulfur hexafluoride.

The process may be performed very flexibly in terms of the number of membranes and adsorber stages. Depending on to what extent the depletion of $SF_6$ is to be effected, one, two or even more adsorber stages are provided.

The number of the membranes and the arrangement of the membrane cartridges will depend on whether a gas with a high or a low $SF_6$ content is to be treated. With a larger number of membranes, the separation effect is greater, and the $SF_6$ content in the permeate which is to be treated by adsorption is lower than when using a small number of membranes. The adsorber may then either be designed to be smaller, or regeneration is necessary at longer intervals. The costs in terms of apparatus may however be higher (larger number of compressors).

It has been determined that even just one or two membrane separation stages and one or two adsorber stages are sufficient to obtain a highly enriched sulfur hexafluoride and a nitrogen gas with at most traces of sulfur hexafluoride.

Organic, asymmetrical membranes are preferred. As is known, there are rubber-elastic membranes ("rubbery membranes") which effect separation based on the solubility of the permeate. Other membranes effect separation based on the diffusibility of the permeate; these are non-rubber-elastic, but rather crystalline, membranes "glassy membranes"; these latter membranes are preferred. The membrane may be of conventional form. Membranes in the form of a bundle of hollow fibre membranes are highly suitable. The membrane material may be made, for example, of polysulfone, polyetherimide, polypropylene, cellulose acetate, polyimide, polyamide, polyaramid or ethyl cellulose, as described in U.S. Pat. No. 5,730,779. Other usable membranes are described in U.S. Pat. 4,838,904. For example, polyimides, polycarbonates, polyesters, polyester carbonates, polysulfones, polyethersulfones, polyamides, polyphenylene oxides and polyolefins are very highly suitable. Preferably the polymer material contains polyester, polycarbonates and polyester carbonates. Polycarbonates which have been derived from a biphenol in which at least 25% of the biphenol units in the polymer chain are tetrahalogenated, the halogen being chlorine or bromine, are outstandingly suitable. Particularly preferred membranes have a polymeric matrix which has two porous surfaces and a layer which permits the separation of the sulfur hexafluoride from the other gas constituents. Such membranes are described in U.S. Pat. No. 4,838,904 (EP-A-0 340 262). If additional impurities such as $SO_2F_2$, $SO_2$ etc. are contained in the gas mixture, purification may take place beforehand, such as washing with water or lye or with adsorbers. Each membrane stage may consist of a plurality of membrane cartridges (arranged in parallel).

The pressure on the entry side of the membrane or membranes is usually higher than the ambient pressure. For example, the gas mixture to be separated may be supplied at a pressure of up to 13 bar. Preferably the entry pressure is from 10 to 12 bar. If a plurality of membranes are provided, a compressor may be arranged in front of each membrane. The temperature is advantageously from 10 to 40° C.

If three membrane stages are used, the separation effect is even better. Preferably the three membranes are connected as follows: the $SF_6/N_2$ gas mixture is fed as feed stream to the first membrane stage. The retentate is fed as feed stream to a second membrane stage. The retentate of this second stage is highly enriched $SF_6$, and can be re-used. The permeate of the first membrane stage is fed as feed stream to the third membrane stage. The permeate of this third stage is $N_2$, virtually free of $SF_6$, and is let off into the environment after passing through the adsorber or adsorbers. The permeate of the second membrane stage and the retentate of the third membrane stage are introduced into the feed stream to the first membrane stage.

It was established that, with zeolites which do not meet the selection criterion according to the invention in terms of modulus and pore size, only poorer adsorption of sulfur hexafluoride or none at all is possible, or that they are substantially less selective. A pore diameter of 5 to 6.5 Å (0.5 to 0.65 nm) is particularly advantageous.

It is possible to regenerate the adsorbents by lowering the pressure (pressure alternation adsorption) and optionally allowing heat to act on the coated adsorbents. The sulfur hexafluoride released may for example be fed to the feed stream into the membrane separation plant.

The process according to the invention is distinguished by optimum splitting of the $SF_6/N_2$ mixture or $SF_6$/air mixtures. The purified nitrogen or the purified air may be let off harmlessly into the environment. The recovered sulfur hexafluoride may either be re-used immediately or after further purification—optionally in liquefied form. The apparatus to be used in the [process] according to the invention may be in mobile form. In this case, the gas mixture, which originates for example from underground cables, may be separated on the spot.

The invention also covers an apparatus. This apparatus for separating sulfur hexafluoride/nitrogen or $SF_6$/air mixtures comprises one, two, three or more membrane separation stages with membranes which are preferentially permeable to nitrogen or air, and one, two or more adsorbers with a bed of zeolites having a silicon dioxide/aluminium oxide ratio (modulus) of at least 80 and a pore diameter of 4 to 7 Å (0.4 to 0.7 nm). What has been stated above applies with regard to the number of membrane and adsorber stages. A compressor is arranged before each membrane stage. A preferred apparatus, as explained in FIG. 1, has two membrane separation stages and two adsorber stages. It further comprises a feed line for the gas mixture to be separated, which line is connected to the inlet into the first membrane separation stage, a connecting line between the first and second membrane separation stages which is intended for introducing the retentate from the first membrane separation stage into the second membrane separation stage, a connecting line between the second and first membrane separation stages, which serves for introducing the permeate of the second membrane separation stage into the first membrane separation stage, a line for removing the retentate from the second membrane separation stage, from which retentate with a high $SF_6$ content can be removed, a line for feeding the permeate of the first membrane separation stage into the first adsorber, a line for feeding the gas leaving the first adsorber into the second adsorber and a line for removing the substantially $SF_6$-free nitrogen gas (or $SF_6$-free air) from the second adsorber.

DETAILED DESCRIPTION OF PREFERRED EMBODIMENTS

Depending on the adsorber capacity and the number of membrane separation stages, merely one adsorber stage may also be provided. Two adsorber stages or more are advantageous, since they permit continuous operation if connected in parallel.

The apparatus may be arranged in mobile form, for example constructed on the loading surface of a motor vehicle (e.g. lorry). Then the process according to the invention can be carried out on the spot.

Figure 1:
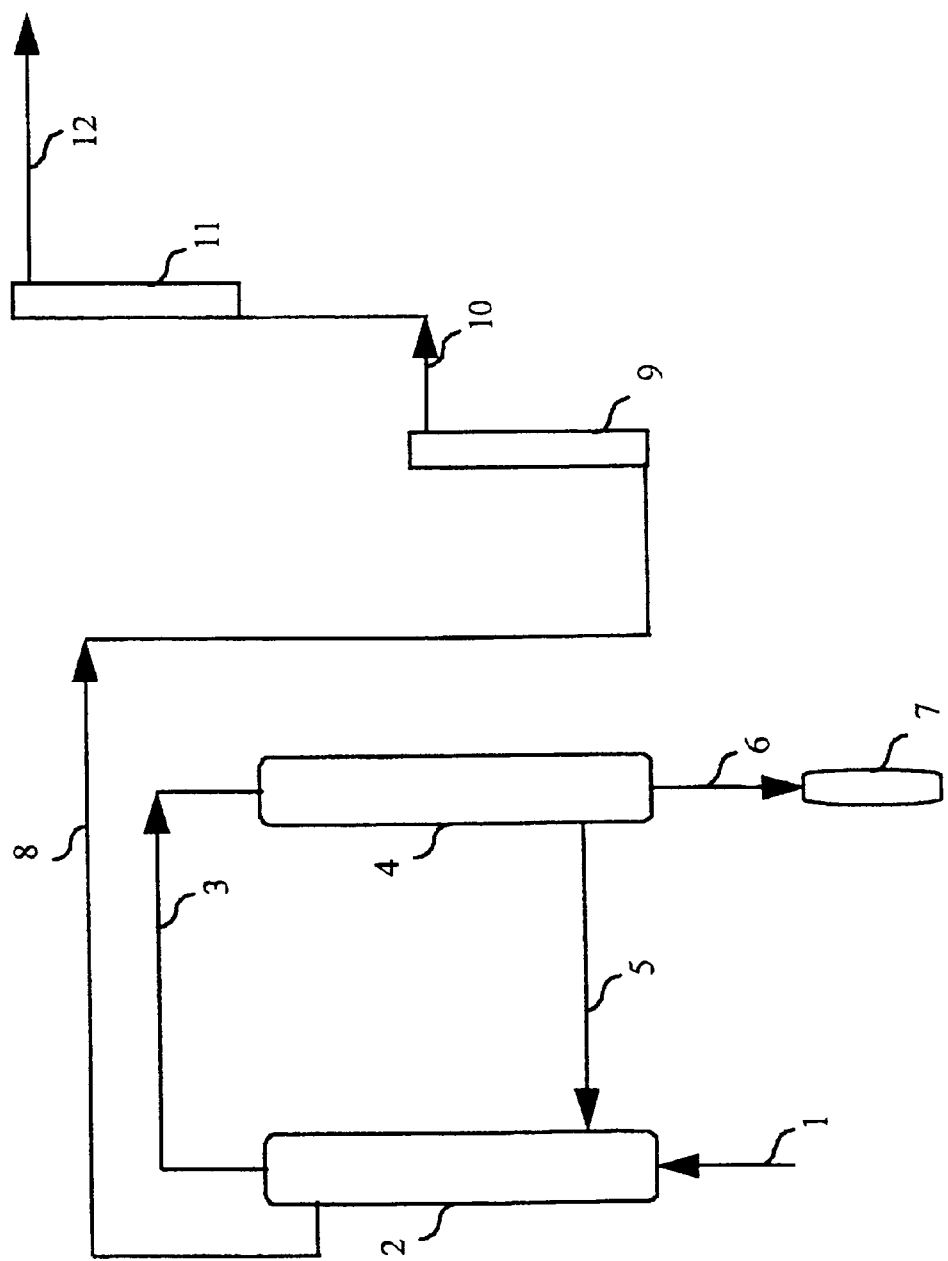
FIG. 1 is a schematic diagram illustrating a system for carrying out the process of the invention.
Figure 2:
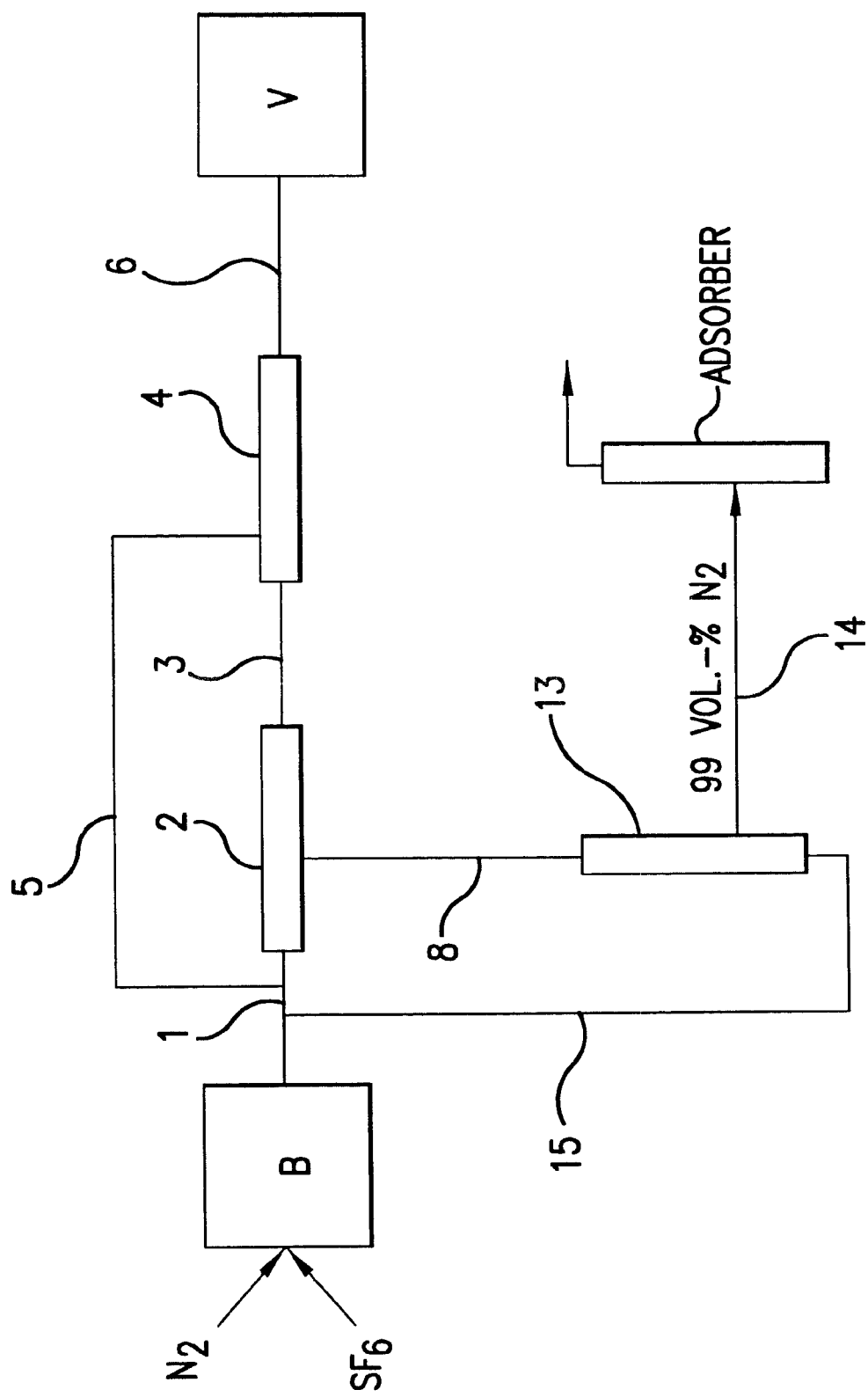
FIG. 2 is a schematic diagram illustrating a preferred system comprising three membrane stages.

The invention will be explained in greater detail with reference to FIG. 1.

Example 1 Combination of Membrane Separation and Sorption

An installation with two membrane separation stages and two adsorbers connected in series was used. This installation is very compact (space required: 30-foot container) and is suitable for construction on the loading surface for example of a truck. For simplicity, the compressors before each membrane are omitted.

The membranes used were of the hollow-fibre type, manufactured by Aga-Gas, type AVIR™. "Wessalith® DAZ F20", manufactured by Degussa, was used. This is a zeolite of the Pentasil type, which has been subjected to dealumination in order to replace the $Al_2O_3$ in the lattice with $SiO_2$ and in this manner to increase the modulus. This type of modification is also used with other zeolites in order to replace $Al_2O_3$ in the zeolite with $Sio_2$. One method provides for contacting the zeolites with $SiCl_4$ for this purpose, cf. W. Otten, E. Gail and T. Frey, Chem.-Ing.-Tech. 64 (1992), No. 10, pages 915–925, in particular pages 915–916.

The zeolite used, "Wessalith® DAZ F20", has a modulus of over 1,000, a pore width of 0.6 nm and a particle size of 2 mm. 500 g of this adsorbent were used.

By mixing nitrogen and sulfur hexafluoride, a gas mixture containing 20% by volume $SF_6$ and 80% by volume $N_2$ was produced, which corresponds to a gas mixture used, for example, in underground cables. The gas mixture at a pressure of 13 bar (absolute) was introduced via line 1 into the first membrane separation stage 2 (1 m³/h). The permeate leaving the first membrane separation stage contained 97% by volume nitrogen and 3% by volume sulfur hexafluoride, and was introduced at approximately ambient pressure via line 8 into the first adsorber 9 and the gas mixture leaving the adsorber was introduced via line 10 into the second adsorber 11. A gas which contained less than 10 ppm sulfur hexafluoride was removed via line 12.

The retentate of the first membrane separation stage contained 50% by volume nitrogen and 50% by volume sulphur hexafluoride and was introduced into the second membrane separation stage 4 via line 3 after it had been compressed to 13bar. The permeate from the second membrane separation stage contained 81% by volume nitrogen and 19% by volume sulphur hexafluoride, and was returned to the first membrane separation stage 2 via line 5. The retentate of the second membrane separation stage contained 95% by volume sulphur hexafluoride and 5% by volume nitrogen. It was introduced into a storage container 7 via line 6. This product is so pure that it can be used directly for re-using the $SF_6$. If desired, however, it may also be purified further.

Example 1 was repeated, this time with 3 membranes. The permeate leaving the third membrane via line 14 still contained 1% by volume $SF_6$ before being passed into the adsorber. The intervals before regeneration are correspondingly longer.

Examples 2 to 13

12 zeolites were investigated in terms of their suitability as adsorbents for separating $SF_6/N_2$ mixtures. An $SF_6/N_2$ mixture co ntaining about 1% by volume $SF_6$ was passed over two adsorbers connected in series, which contained a bed of 500 ml of the respective adsorbent. The mixture was passed through until about 10 g $SF_6$ had been passed through. The mixture leaving the second adsorber was investigated using gas chromatography, and the $SF_6$ concentration was determined. The first series of tests was carried out at ambient pressure (1 bar).

The adsorbents investigated, their characteristics and an evaluation of their adsorptive capacity are summarised in the following table.

Manufacturers: No. 1, No. 4: Degussa AG;
   No. 5: Bayer AG, Leverkusen;
   No. 3, No. 7, No. 8: Chemie Uetikon GmbH, Uetikon (Switzerland);
   No. 2: Sued-Chemie, Munich;

No. 6: W.R. Grace, Nd. Worms;
No. 9: Solvay; No. 10: UOP, Nd. Erkrath;
No. 11: Atochem Deutschland,
Nd. Dusseldorf;
No. 12: Zeoline, Engis (Belgium)
   1) Adsorber 1, measured after 5 min.
   2) Adsorber 2, measured after 10 min.
   3) Used as extrudate

TABLE 1

Zeolites Investigated

| No. | Trade Name | Type | Modulus | Pore Diameter [nm] | Particle size | Concentration of $SF_6$ (mg/l) after absorber $1^{1)}$ | $2^{2)}$ | Observations |
|---|---|---|---|---|---|---|---|---|
| 1 | Wessalith DAZ F20 | Pentasil MFI | >1,000 | 0.6 | 2 mm | 12.56 | 10.52 | |
| 2 | T 4480 | Pentasil ZSM5 | 90 | 0.58 | <1 $\mu m^{3)}$ | 1.62 | 0.38 | |
| 3 | Zeocat PZ-2/400 | ZSM 5, Na form | 400 | 0.53 × 0.56; 0.51 × 0.55 | 2–5 mm | 11.48 | 0.23 | |
| 4 | Wessalith DAY F20 | Y-zeolite (FAU) | >200 | 0.8 | 2 mm | 60.98 | 61.23 | Comparison example |
| 5 | Baylith WE 894 | X in Na form | 2.5 | 0.9 | 2–4 mm | 56.02 | 46.08 | Comparison example |
| 6 | Grace 522 | A | 2.6 | 0.5 | 1.6–2.5 mm | 61.93 | 28.82 | Comparison example |
| 7 | Zeocat FM-8 | Mordenite SM | 12 | 0.26–0.57; 0.65–0.7 | 1–2 $\mu m$ | 61.16 | 62.26 | Comparison example |
| 8 | Zeocat 6-08-02 | Y-zeolite | 5–6 | 0.74 | 2.45 nm | 41.64 | 56.57 | Comparison example |
| 9 | Sicolith | 4A-granules | 2 | 0.4 | 1–2 mm | 61.37 | 61.21 | Comparison example |
| 10 | Molsieb 13x UOP | Y-type, Na form | 1–2 | 1.0 | 1.45–2 mm | 1.91 | 35.19 | Comparison example |
| 11 | ATO Siliporite GS | X-type, Na form | 1.25 | 1.0 | 1.5–1.85 mm | 54.82 | 56.82 | Comparison example |
| 12 | Zeoline | Na form | 2 | 0.4 | 2.7 $\mu m$ | 25.91 | 55.21 | Comparison example |

The table shows that zeolites having a modulus of >80 and a pore width of 4 to 7 nm display a good adsorptive capacity even at ambient pressure.

It was observed that for the adsorbents suitable for the process according to the invention the adsorption of $SF_6$ is improved, but the adsorption of $N_2$ is reduced, if the pressure is increased; the selectivity therefore increases. However, higher costs in terms of apparatus are incurred.

Examples 1–3 and 5 were repeated at a pressure of 2, 3 and 4 bar. The fine-particled zeolite (particle size in the micrometre range) of example 3 displayed such good values even at 1 bar that they were not improved further by operating under pressure. The other zeolites displayed an improvement in the adsorption.

Further tests at an $SF_6$ concentration of 2 and 4% by volume showed that in this case too the fine-particled zeolite of Example 3 yielded the best results.

What is claimed is:

1. A process for separating a mixture of $SF_6$ and nitrogen or air, said process comprising:
   contacting the mixture in at least one adsorption stage with hydrophobic zeolites having an $SiO_2/Al_2O_3$ ratio of at least 80 and a pore diameter of 4 to 7 Å (0.4 to 0.7 nm) to preferentially adsorb $SF_6$, and
   recovering nitrogen or air depleted in $SF_6$.

2. A process according to claim 1, wherein said hydrophobic zeolite has a pore diameter of 5 to 6.5 Å (0.5 to 0.65 nm).

3. A process according to claim 1, wherein said hydrophobic zeolite is finely divided.

4. A process according to claim 1 wherein the adsorption is carried out at an absolute pressure of at most 5 atmospheres.

5. A process according to claim 1, wherein said mixture is selected from the group consisting of $SF_6$-containing exhaust gas, exhaust gas from magnesium processing, insulating gas from window panes, and filler gas from tires.

6. A process according to claim 1, wherein said mixture is an $SF_6$/nitrogen mixture having an initial $SF_6$ content of 5 to 30 volume-% or an $SF_6$/air mixture having an initial $SF_6$ content of 0.05 to 2 volume-%.

7. A process according to claim 1, wherein the mixture is first separated in at least one membrane separation stage into a retentate having an increased $SF_6$ content and a permeate having a decreased $SF_6$ content, and the permeate is then contacted with said hydrophobic zeolite in said at least one adsorption stage.

8. A process according to claim 7, wherein said mixture is an $SF_6$/nitrogen mixture having an initial $SF_6$ content of 5 to 30 volume-% or an $SF_6$/air mixture having an initial $SF_6$ content of 0.05 to 2 volume-%.

9. A process according to claim 7, wherein said mixture is first separated in at least two membrane separation stages and then subjected to $SF_6$ adsorption in at least two adsorption stages.

10. A process according to claim 9, wherein
    retentate from a first membrane separation stage is fed to a second membrane separation stage;
    permeate from the second membrane separation stage is fed back to the first membrane separation stage, and
    permeate from the first membrane separation stage is fed to said at least two adsorption stages.

11. A process according to claim 10, wherein the recovered nitrogen or air has an $SF_6$ content of less than 10 ppm $SF_6$ at ambient pressure.

12. An apparatus for separating mixtures of $SF_6$ and nitrogen, said apparatus comprising at least one membrane separation stage with a membrane which is preferentially permeable to nitrogen, and at least one adsorption stage comprising a bed of zeolite having an $SiO_2/Al_2O_3$ ratio of at least 80 and a pore diameter of 4 to 7 Å (0.4 to 0.7 nm).

13. An apparatus according to claim 12, comprising first and second membrane separation stages, first and second adsorber stages, a supply line for feeding a gas mixture to be separated to the first membrane separation stage, a connecting line for feeding retentate from the first membrane separation stage to the second membrane separation stage, a recycle line for feeding permeate from the second membrane separation stage back to the first membrane separation stage, a discharge line for removing retentate with a high $SF_6$ content from the second membrane separation stage, a line for feeding permeate from the first membrane separation stage to the first adsorber stage, a line for feeding gas from the first adsorber stage to the second adsorber stage, and an outlet line for discharging substantially $SF_6$-free nitrogen gas from the second adsorber.

14. An apparatus according to claim 13, further comprising a third membrane separation stage, a connecting line for introducing permeate from the third membrane separation stage into the first adsorber stage, a connecting line for feeding retentate from the third membrane separation stage back to the first membrane separation stage, a connecting line for introducing permeate from the first membrane separations stage into the third membrane separation stage, and a connecting line for introducing permeate from the second membrane separation stage back to the first membrane separation stage.

15. An apparatus according to claim 12, wherein said apparatus is combined on a motor vehicle so as to be mobile.

* * * * *